US005894580A

United States Patent [19]

Yoshida

[11] Patent Number: 5,894,580

[45] Date of Patent: Apr. 13, 1999

[54] DISPLAY CONTROL METHOD AND DISPLAY CONTROL APPARATUS ADAPTED TO PORTABLE DATA PROCESSING EQUIPMENT PROVIDED WITH A BATTERY-DRIVABLE FLAT PANEL DISPLAY

[75] Inventor: Norio Yoshida, Tokyo, Japan

[73] Assignee: Kabushiki Kaisha Toshiba, Kawasaki, Japan

[21] Appl. No.: 08/739,310

[22] Filed: Oct. 29, 1996

[30] Foreign Application Priority Data

Feb. 29, 1996 [JP] Japan .................................... 8-043655

[51] Int. Cl.$^{6}$ ........................................ G06F 1/32

[52] U.S. Cl. ........................................ 395/750.08

[58] Field of Search ........................ 395/750.08, 750.06; 345/432

[56] References Cited

U.S. PATENT DOCUMENTS

| | | | |
|---|---|---|---|
| 5,293,494 | 3/1994 | Saito et al. | 395/750.08 |
| 5,315,695 | 5/1994 | Saito et al. | 345/432 |
| 5,341,503 | 8/1994 | Gladstein et al. | 395/750.08 |
| 5,386,577 | 1/1995 | Zenda | 395/750.08 |
| 5,454,112 | 9/1995 | Kadono et al. | 395/750.08 |
| 5,481,732 | 1/1996 | Shahbazi | 395/750.05 |
| 5,566,340 | 10/1996 | Stewart et al. | 395/750.05 |

FOREIGN PATENT DOCUMENTS

| | | | |
|---|---|---|---|
| 4-8128 | 1/1992 | Japan | G06F 1/26 |
| 4-195619 | 7/1992 | Japan | G06F 1/32 |

*Primary Examiner*—Glenn A. Auve
*Attorney, Agent, or Firm*—Finnegan, Henderson, Farabow, Garrett & Dunner, L.L.P.

[57] ABSTRACT

A display control unit makes a reference to a display off-time table to change automatic turn-off time (automatic interruption time) of a display unit, which is set to a off-timer as the residual capacity of the battery is changed. The off-timer starts measuring the time when no input is performed by the operation of the user. When the measured time reaches the set time, a switch circuit (SW) is switched off so that the backlight of the display unit is turned off.

8 Claims, 5 Drawing Sheets

DISPLAY CONTROL METHOD AND DISPLAY CONTROL APPARATUS ADAPTED TO PORTABLE DATA PROCESSING EQUIPMENT PROVIDED WITH A BATTERY-DRIVABLE FLAT PANEL DISPLAY

BACKGROUND OF THE INVENTION

1. Field of the Invention

The present invention relates to a display control method and a display control apparatus adaptable to electronic equipment which has a display unit and which can be operated by a battery, for example, a portable information processing apparatus including a battery which can electrically be charged and having a display, such as a flat panel display, which can be operated by the battery.

2. Description of the Related Art

A portable information processing apparatus having a display unit and enabled to be operated by a battery has variously been contrived in order to prevent wasteful electric power consumption when operated by the battery.

As one of methods of saving electric power, a so-called automatic display-turn-off function can be employed with which the operation of a mouse or a keyboard is monitored by a timer, and if the mouse and the keyboard is not operated within a predetermined time period, then the display operation is interrupted so as to save electric power.

An automatic display-turn-off function of the foregoing type of the conventional personal computer has been arranged such that the automatic display interruption time, which has been once set, is not changed (a fixed time is set) until the time is again set.

With a small-size electronic equipment, such as a personal computer, if the automatic interruption time is shortened in a case where the electronic equipment is operated by the battery, the usage of the battery can be reduced. On the other hand, the handling facility deteriorates. If the automatic interruption time is elongated, the handling facility is improved. However, the usage of the battery is enlarged.

As described above, since the automatic display-interruption-time has been fixed, the life of the battery and the handling facility for the user cannot easily be adjusted. Moreover, the contents of an intended process and the characteristics of the operation of the user result in different relationship.

A flat panel display of a type, having a backlight, a sidelight or the like, is enabled to save electricity by darkening the brightness of the backlight.

Also control of the display of the foregoing type has been performed such that the brightness, which has been set, is not changed (fixed brightness is set) until it is set again.

Although the usage of the battery of a small-size electronic equipment, such as a personal computer, can be reduced if the brightness is darkened (lowered) in a state where it is operated by a battery, the display cannot easily visually be observed. If the brightness is raised, the display can easily be recognized. However, the usage of the battery is enlarged.

In a case where the brightness of the display is fixed as described above, the life of the battery and easy recognition of the display cannot easily be adjusted. Moreover, the environment of use of the equipment, the environmental illumination, contamination of the surface of the display and lowering of the brightness as the time elapses cause different results to take place.

As a conventional method of saving electricity which is consumed by a display, a display control method is known which has the steps of monitoring the mouse and the keyboard; and interrupting the operation of the display if the mouse or the display is not operated within the time, which has been set previously, so that electricity is saved.

However, the above-mentioned conventional display control involves waste in the electric power consumption because the display is in the display operation state until the set time elapses even if the display is not watched.

If the mouse or the keyboard is not operated during the period in which the display is watched, the display operation is interrupted during watching. Therefore, the operation facility is unsatisfactory.

As a conventional method of saving electricity of a (flat panel type) display, a display control means is known in which the brightness of the backlight is darkened after a set time has elapsed so that electricity is saved.

However, the foregoing conventional display control involves waste in the electric power consumption because the display is in the display state until the set time elapses even if the display is not watched.

As described above, all of the conventional display control means for saving electricity involve waste of electric power consumption, and a satisfactory effect for saving electricity cannot be obtained when the electronic equipment is operated by a battery.

SUMMARY OF THE INVENTION

An object of the present invention is to provide a display control method and a display control apparatus capable of satisfactorily saving electricity when electronic equipment, which can be operated by a battery, is operated by the battery.

That is, an object of the present invention is to provide a display control method and a display control apparatus having a function capable of changing the automatic display-interruption time as the residual capacity of the battery is changed to prevent influence on the operation facility for a user and enabling the life of the included battery to be elongated Another object of the present invention is to provide a display control method and a display control apparatus having a function capable of changing the brightness of the display as the residual capacity of the battery is changed to prevent influence on the operation facility for a user and enabling the life of the included battery to be elongated.

Another object of the present invention is to provide a display control method and a display control apparatus having a function capable of changing automatic display-interruption-time in accordance with whether the equipment is being operated or not operated to prevent influence on the operation facility for a user and enabling the life of the included battery to be elongated.

Another object of present invention is to provide a display control method and a display control apparatus having a function capable of changing the brightness of the display in accordance with whether the equipment is being operated or not operated to prevent influence on the operation facility for a user and enabling the life of the included battery to be elongated.

According to the present invention, there is provided a display control method and a power-saving display control apparatus for electronic equipment, which can be operated by a battery, the invention being arranged to save electricity required to perform display while maintaining the operation facility.

That is, the present invention is characterized by a function capable of changing the automatic display-interruption time (for example, the automatic display-interruption time is changed at each timing when the residual capacity of the battery is changed from 100% to 75%, 50% and 25%) as the residual capacity of the battery is changed to elongate the life of the included battery while preventing an influence on the operation facility for a user.

The present invention is characterized by a function capable of changing (lowering) the brightness of the display (for example, the automatic display-interruption time is changed at each timing when the residual capacity of the battery is changed from 100% to 75%, 50% and 25%) as the residual capacity of the battery is changed to elongate the life of the included battery while preventing an influence on the operation facility for a user.

The present invention is characterized by a function capable of changing the automatic display-interruption-time (for example, a touch sensor is provided to determine a state where the mouse or the keyboard is touched (including a state where it is touched without any input) as a state of use and a state where it is not touched as a non-operation state to change the automatic display-interruption-time in each state) in accordance with whether the equipment is being operated or not operated to elongate the life of the included battery while preventing an influence on the operation facility for a user.

The present invention is characterized by a function capable of changing the brightness of the display (for examples a touch sensor is provided to determine a state where the mouse or the keyboard is touched (including a state where it is touched without any input) as a state of use and a state where it is not touched as a non-operation state to change the display brightness in each state) in accordance with whether the equipment is being operated or not operated to elongate the life of the included battery while preventing an influence on the operation facility for a user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
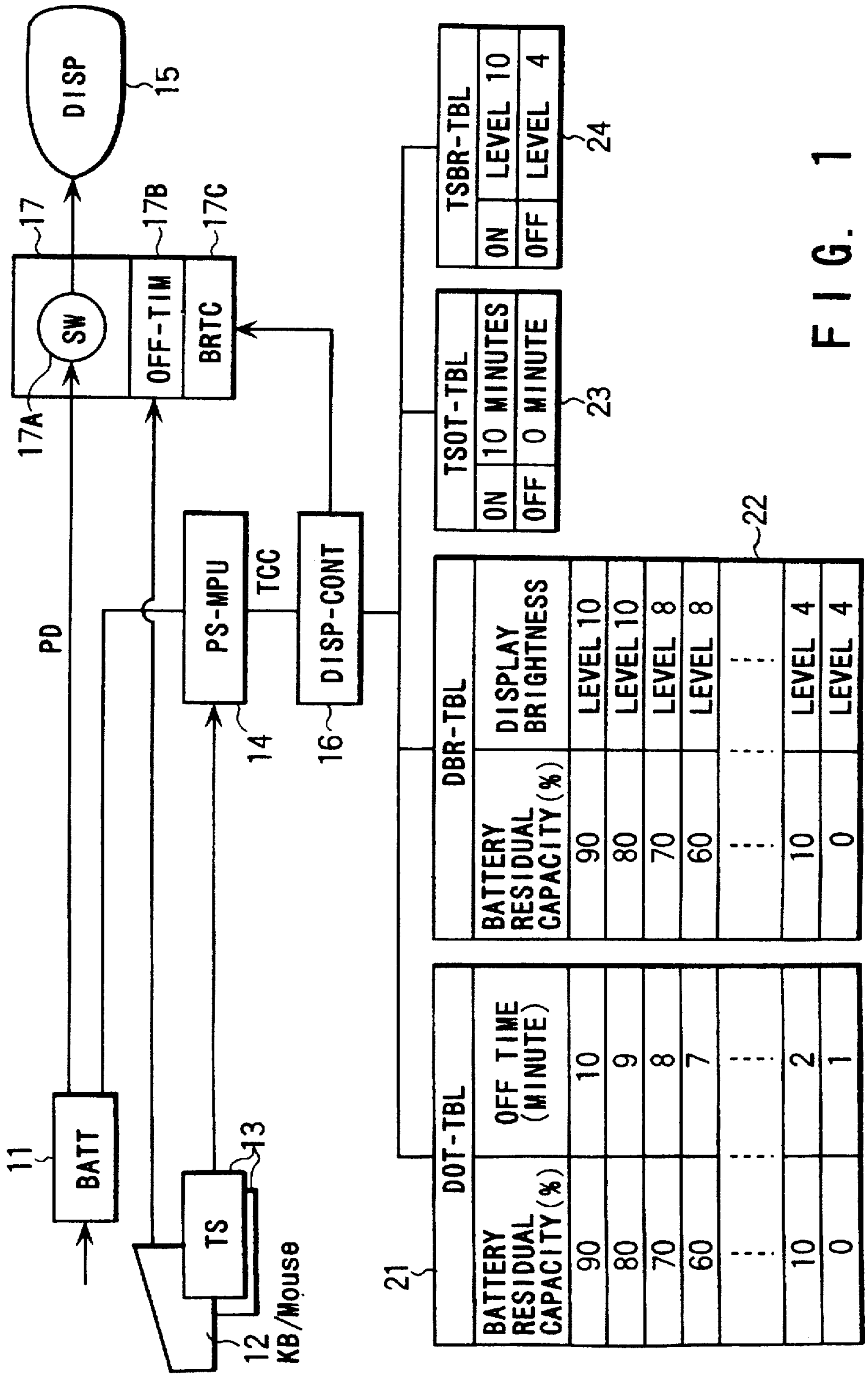
FIG. 1 is a block diagram showing the structure of the essential portion of the embodiment in which the present invention is adapted to a portable computer.

Referring to the drawings, embodiments of the present invention will now be described.

FIG. 1 is a block diagram showing an essential portion of the embodiment of the present invention adapted to a portable computer.

Referring to FIG. 1, a battery 11 supplies electric power to the system, charging/discharging of the battery 11 being controlled by a microprocessor (PS-MPU) 14 for controlling the power source and the residual capacity of the battery being checked.

An operation and input portion 12 includes a keyboard (KB), a mouse (Mouse) of a touch pen, and 13 represents a plurality of touch sensors (TS) provided for predetermined operation surfaces of each of the operation and input portions (KB, Mouse) 12.

A power-source-control microprocessor (PS-MPU) 14 for controlling the power source by controlling the power source for the system to be turned on or off, controlling charge/discharge of the battery 11 and performing a process for checking the residual capacity of the battery 11 (residual capacity of the battery 11). Moreover, a variety of display control processes for saving electricity as shown in FIGS. 2 to 5 are performed. That is, a process for determining whether the equipment is in a state where it is being operated in accordance with each signal supplied from the touch sensor (TS) 13, a process for setting a variety of control tables to be described later, and a process of administrating the same are performed. Moreover, a variety of display control processes as shown in FIGS. 2 to 5 and intended to save electricity are performed in accordance with, for example, a state where the equipment is being operated. Note that TCC represents display control information including information on the residual capacity of the battery and information on whether the equipment is being operated or not operated supplied from the microprocessor (PS-MPU) 14, the display control information being transmitted to a display control unit (DISP-CONT) 16.

A display unit (DISP) 15 displays and outputs, under control of the display control unit (DISP-CONT) 16, input information and information to be processed. In this embodiment, a flat panel display having a backlight is taken as an example.

A display control unit (DISP-CONT) 16 controls the operation of the display under control of a system control CPU (not shown). The display control unit (DISP-CONT) 16 receives display control information TCC transmitted from the microprocessor (PS-MPU) 14 to control the operation of the display for saving electricity which is consumed by the display unit (DISP) 15 in accordance with the residual capacity the battery and information whether the equipment is being operated or not operated, the information being included in the display control information TCC.

A display-power-saving circuit 17 performs display operation control for saving electricity which is consumed by the display unit (DISP) 15 under control of the display control unit (DISP-CONT) 16. The display-power-saving circuit 17 having a switch circuit (SW) 17A, an off-timer (OFF-TIM) 17B and a brightness varying control portion 17C.

Among the above-mentioned components of the display-power-saving circuit 17, the switch circuit (SW) 17A, under control of the display control unit (DISP-CONT) 16, turns on/off the backlight of the display unit (DISP) 15.

The off-timer (OFF-TIM) 17B starts time measuring operation if the keyboard (KB), the mouse (Mouse), the touch pen or the like is not operated. When the measured time reaches the set time, the off-timer (OFF-TIM) 17B turns off the switch circuit (SW) 17A. The time measured by the off-timer (OFF-TIM) 17B is reset whenever any one of the keyboard (KB), the mouse (Mouse), the touch pen or the like of the operation and input portion 12 is operated.

The brightness varying control portion 17C is controlled by the display control unit (DISP-CONT) 16 to control the display brightness of the display unit (DISP) 15 such that it controls the display brightness of the display unit (DISP) 15 in accordance with the brightness level (arranged such that the highest brightness is set to be brightness level 10) instructed by the display control unit (DISP-CONT) 16.

Tables 21 to 24 control the display which are used to control the display for the purpose of saving electricity which is consumed by the display unit (DISP) 15, the tables 21 to 24 being set by the display control unit (DISP-CONT) 16 and arranged such that a reference to the same is made.

Among the above-mentioned display control tables, reference numeral 21 represents a display off-time table (DOT-TBL) according to a first embodiment of the present invention and arranged to define the relationship between the residual capacity % of the battery and the automatic turn-off time (minutes) That is, the residual quantities of the battery for each 10% and automatic turn-off time (minutes) for each residual capacity are made to correspond to one another. If the residual capacity of the battery is 100% to 90%, the automatic turn-off time is set to be 10 minutes, while the automatic turn-off time is set to be 7 minutes when the residual capacity of the battery is 69% to 60%. Note that the residual capacity of the battery and the automatic turn-off time may arbitrarily be changed.

A display brightness table (DBR-TBL) 22 according to a second embodiment of the present invention is arranged to define the relationship between the residual capacity (%) of the battery and the level of the display brightness. That is, the residual quantities of the battery for each 10% and the display brightness level for each residual capacity are made to correspond to one another. If the residual capacity of the battery is 100% to 90%, the display brightness level is set to be 10 (the highest level), while the display brightness level is set to be 8 when the residual capacity of the battery is 69% to 60%. Note that the residual capacity of the battery and the display brightness level may arbitrarily be changed.

A touch sensor off-time table (TSOT-TBL) 23 according to a third embodiment of the present invention is arranged to define the relationship between the state of use of the equipment and each automatic turn-off time (minutes). That is, when a user of the equipment touches the touch sensor (TS) 13 and, therefore, any one of the touch sensors (TS) 13 is turned on, that is, when the display control unit (DISP-CONT) 16 has determined that the equipment is being operated, the automatic turn-off time is set to be 10 minutes and all of the touch sensors (TS) 13 are turned off. When the display control unit (DISP-CONT) 16 has determined that the equipment is not being operated, the time is set to be 0 minute (the display is immediately turned off when the equipment is not being operated). Note that the automatic turn-off time may arbitrarily be changed.

A touch sensor brightness table (TSBR-TBL) 14 according to a fourth embodiment of the present invention is arranged to define the relationship between the state of use of the equipment and each display brightness level. That is, when a user of the equipment touches the touch sensor (TS) 13 and, therefore, any one of the touch sensors (TS) 13 is turned on, that is, when the display control unit (DISP-CONT) 16 has determined that the equipment is being operated, the display brightness level is set to be 10 (the highest level) and all of the touch sensors (TS) 13 are turned off. When the display control unit (DISP-CONT) 16 has determined that the equipment is not being operated, the display brightness level is set to be 4. Note that the display brightness level may arbitrarily be changed.

Figure 2:
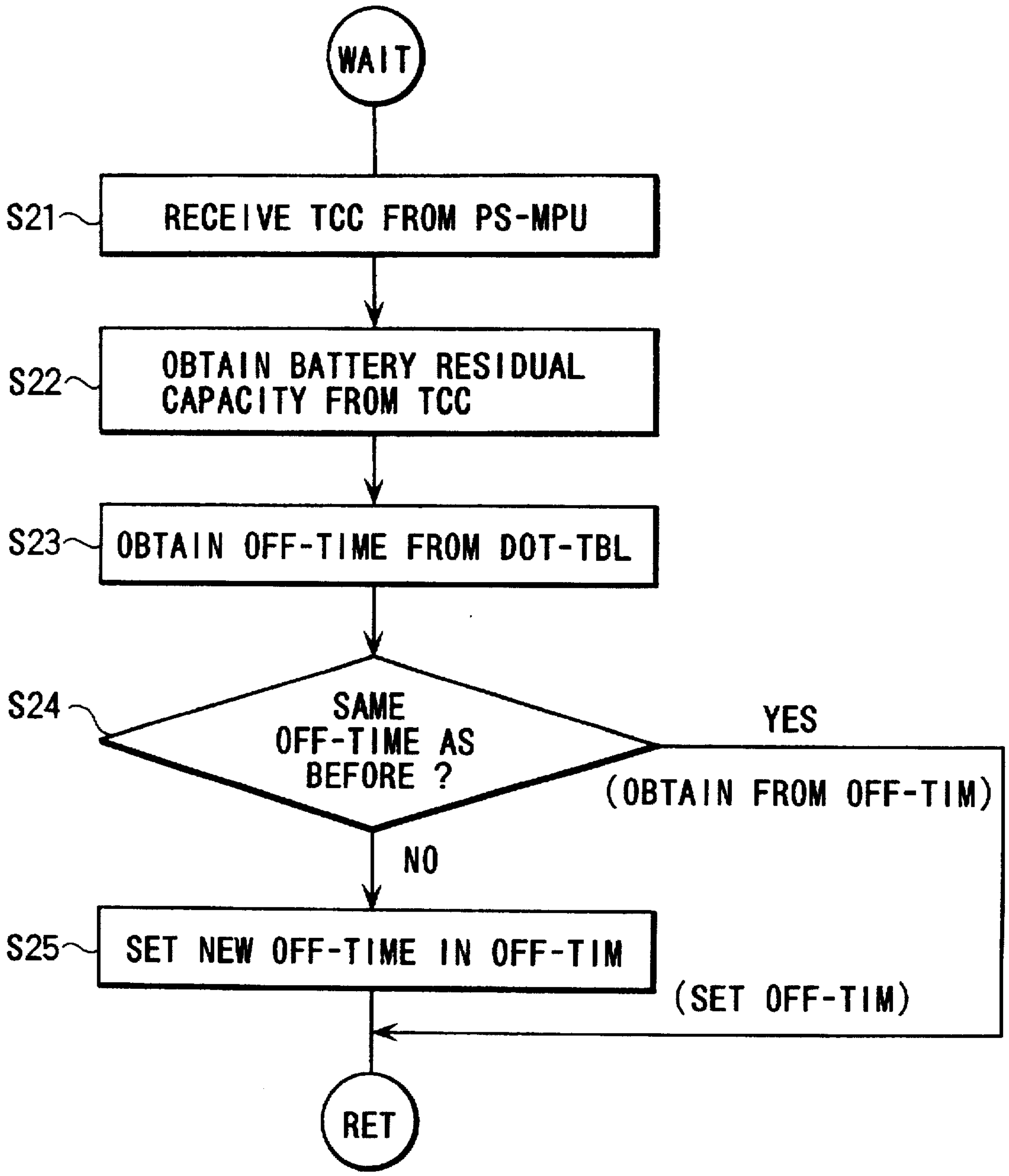
FIG. 2 is a flow chart showing the procedure of the process according to the first embodiment of the present invention.

FIG. 2 is a flow chart showing the procedure according to the first embodiment of the present invention. In this embodiment, the microprocessor (PS-MPU) 14 performs control to realize a function of changing the automatic display-interruption-time as the residual capacity of the battery is changed.

Figure 3:
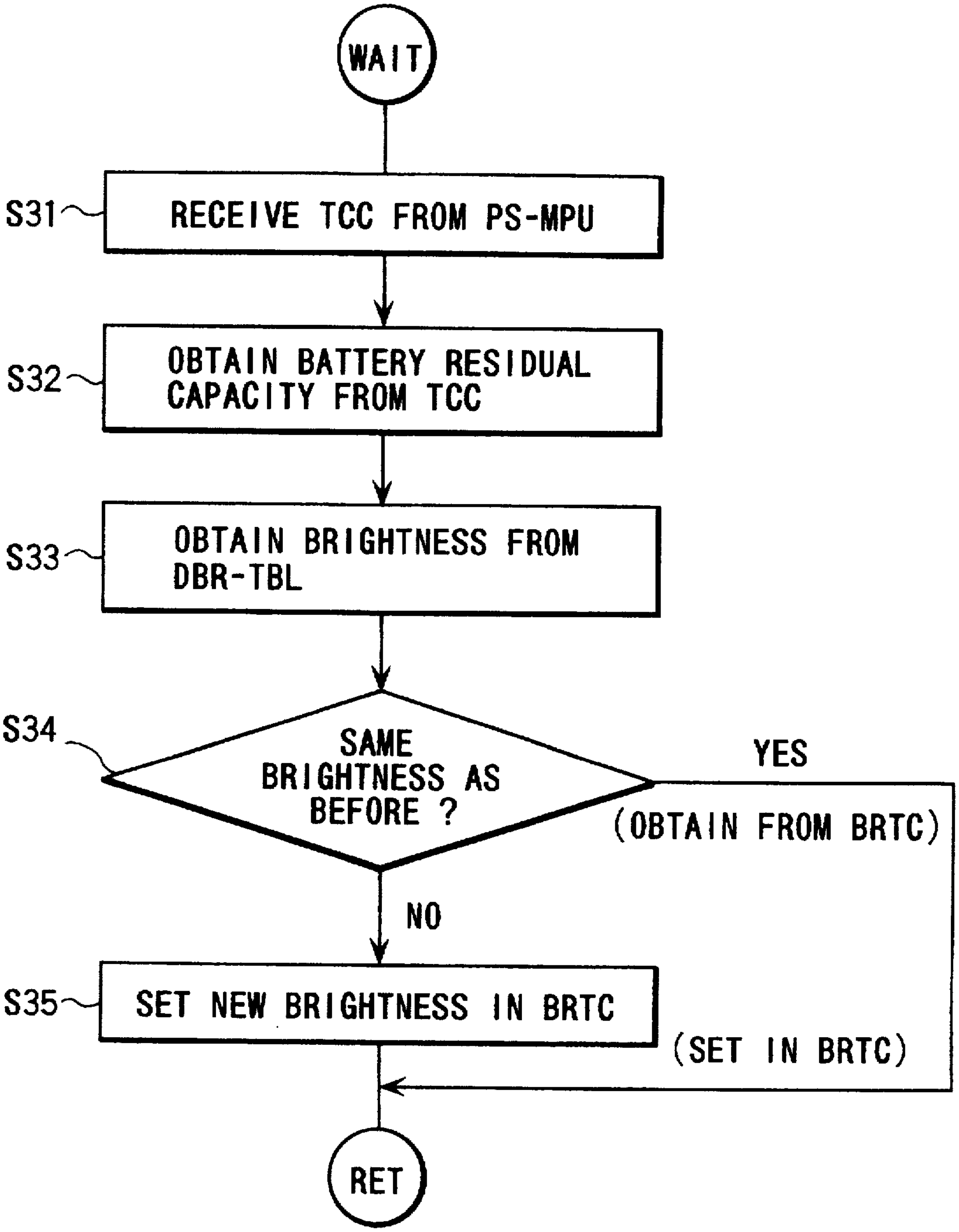
FIG. 3 is a flow chart showing the procedure of the process according to the second embodiment of the present invention.

FIG. 3 is a flow chart showing the procedure according to the second embodiment of the present invention. In this embodiment, the microprocessor (PS-MPU) 14 performs control to realize a function of changing the brightness of the display as the residual capacity of the battery is changed.

Figure 4:
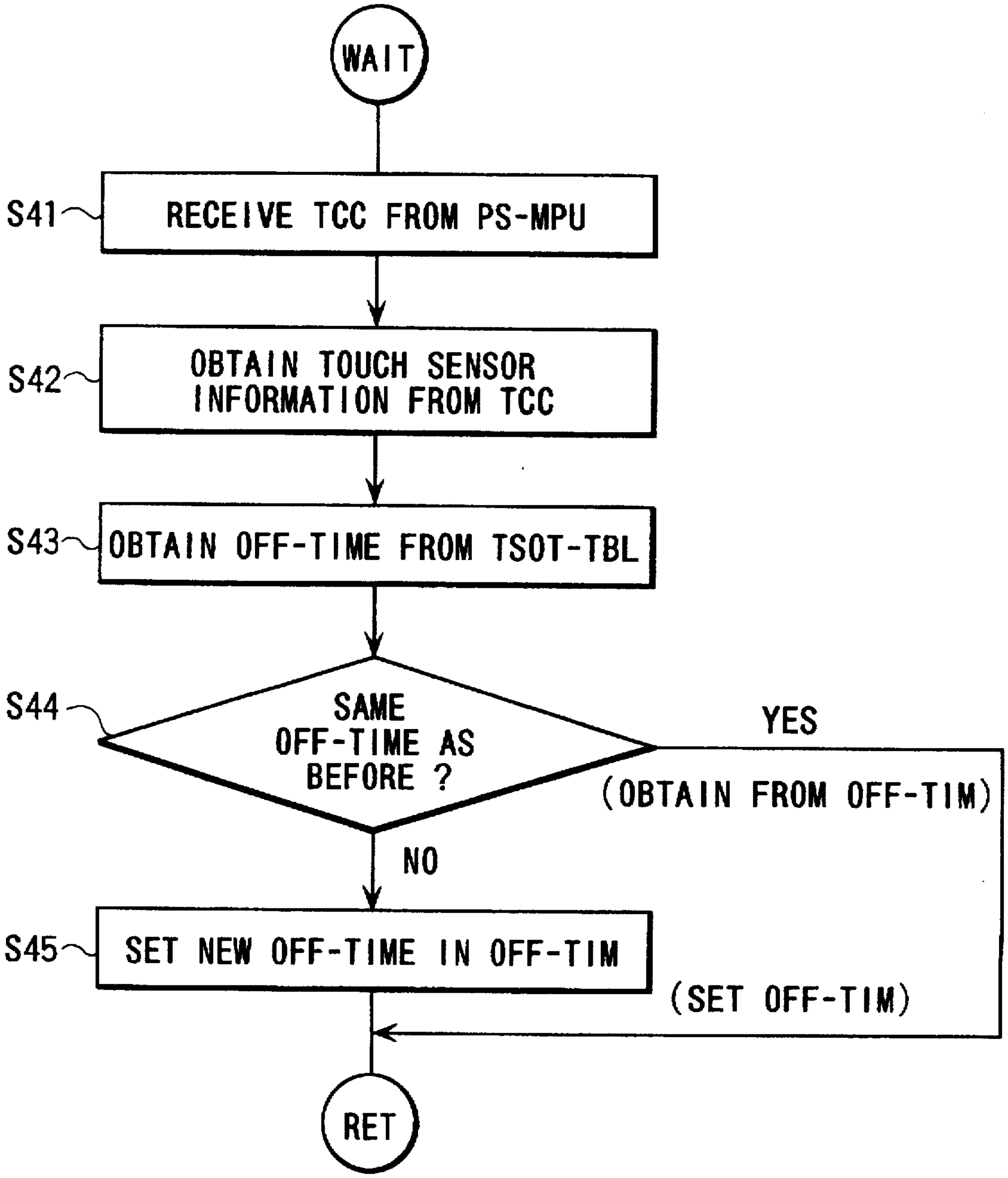
FIG. 4 is a flow chart showing the procedure of the process according to the third embodiment of the present invention.

FIG. 4 a flow chart showing the procedure according to the third embodiment of the present invention. In this embodiment, the microprocessor (PS-MPU) 14 performs control to realize a function of changing the automatic display-interruption-time in accordance with whether the equipment is being operated or not operated.

Figure 5:
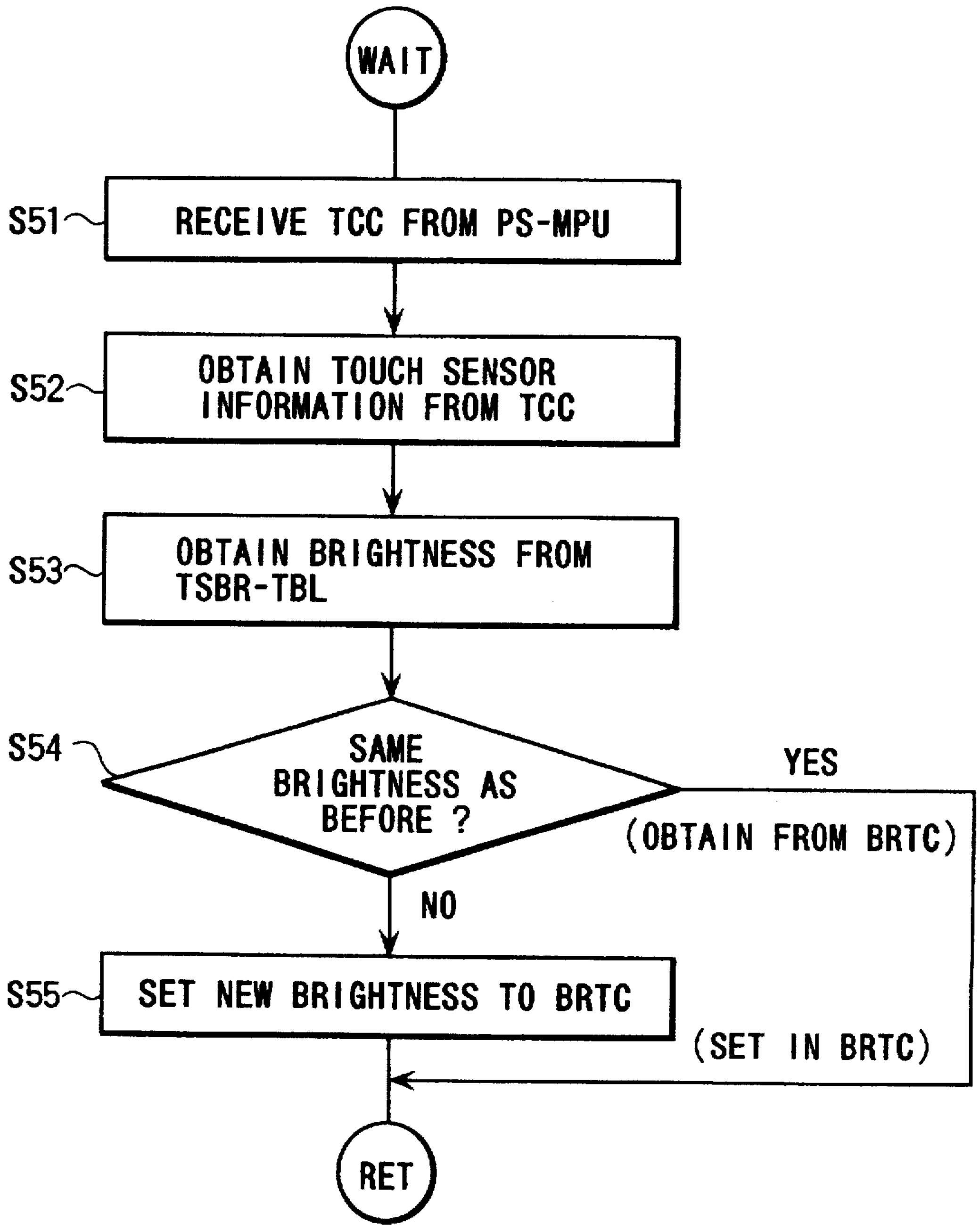
FIG. 5 is a flow chart showing the procedure of the process according to the fourth embodiment of the present invention.

FIG. 5 is a flow chart showing the procedure according to the fourth embodiment of the present invention. In this embodiment, the microprocessor (PS-MPU) 14 performs control to realize a function of changing the brightness of the display in accordance with whether the equipment is being operated or not operated.

Referring to the figures above, the operation according to each of the embodiments of the present invention will now be described.

Initially, referring to FIGS. 1 and 2, the operation of the first embodiment of the present invention will now be described. According to the first embodiment, the function of changing the automatic display-interruption-time as the residual capacity of battery is changed is realized.

The microprocessor (PS-MPU) 14 periodically checks the residual capacity of the battery 11 when the system is being operated with the battery 11 to transmit display control information TCC having information on the residual capacity of the battery to the display control unit (DISP-CONT) 16 (step S21 shown in FIG. 2).

The display control unit (DISP-CONT) 16 makes a reference to the display off-time table (DOT-TBL) 21 in accordance with information on the residual capacity of the battery included in the display control information TCC to acquire automatic turn-off time corresponding to the residual capacity of the battery so as to determine whether the automatic turn-off time is the same as the time set to the off-timer (OFF-TIM) 17B (steps S22 to S24 shown in FIG. 2).

If the automatic turn-off time acquired from the display off-time table (DOT-TBL) 21 is the same as the time set to the off-timer 17B, the time set to the off-timer 17B is not updated. If the automatic turn-off time acquired from the display off-time table (DOT-TBL) 21 is different from the time set to the off-timer 17B, the time acquired from the display off-time table (DOT-TBL) 21 is set to the off-timer 17B (step S25 shown in FIG. 2).

The off-timer 17B starts the time measuring operation when the keyboard (KB), the mouse (Mouse), the touch pen or the like of the operation and input portion 12 is not operated. When the measured time reaches the set time, the off-timer 17B controls to turn off the switch circuit (SW) 17A which turns on/off the backlight of the display unit (DISP) 15 to interrupt supply of electric power to the backlight of the display unit (DISP) 15. The time measured by the off-timer 17B is reset whenever the keyboard (KB), the mouse (Mouse), the touch pen or the like of the operation and input portion 12 is operated.

As described above, the automatic turn-off time (the automatic display-interruption-time) of the display unit (DISP) 15 is varied as the residual capacity of the battery 11 is changed. In this embodiment, when the residual capacity of the battery 11 is changed from 100% to 75%, 50% and 25%, the automatic display-turn-off time (the automatic interruption time) of the display unit (DISP) 15 is changed at each timing. When the residual capacity of the battery 11 is 100% to 90%, the automatic turn-off time is 10 minutes. When the residual capacity is 69% to 60%, the time is 7 minutes.

As a result of the above-mentioned display control, the time for which the equipment can be operated by the battery 11 can be elongated while preventing the influence on the operation facility for the user.

The residual capacity of the battery and the automatic turn-off time set to the display off-time table (DOT-TBL) 21 may arbitrarily be changed on, for example, a set-up window or a pop-up window, under control of the CPU (not shown) for controlling the system.

Referring to FIGS. 1 and 3, the operation of the second embodiment of the present invention will now be described.

According to this embodiment, the function capable of changing the display brightness of the display as the residual capacity of the battery is changed is realized. That is, in this embodiment, the display brightness of the display is lowered (for example, the display brightness is lowered by restraining the electric power for operating the backlight) to prevent wasteful electric power which is consumed by the display unit to save electricity.

The microprocessor (PS-MPU) 14 periodically checks the residual capacity of the battery 11 when the system is being operated by the battery 11 so as to transmit, to the display control unit (DISP-CONT) 16, display control information TCC including information on the residual capacity of the battery (step S31 shown in FIG. 3).

The display control unit (DISP-CONT) 16 makes a reference to the display brightness table (DBR-TBL) 22 in accordance with information on the residual capacity of the battery included in display control information TCC received from the microprocessor (PS-MPU) 14 to acquire display brightness corresponding to the residual capacity of the battery so as to determine whether the acquired display brightness is the same as the display brightness set to the brightness varying control portion 17C (steps S32 to S34 shown in FIG. 3).

If the display brightness acquired from the display brightness table (DBR-TBL) 22 is the same as the display brightness set to the brightness varying control portion 17C, the display brightness set to the brightness varying control portion 17C is not updated. If the display brightness acquired from the display brightness table (DBR-TBL) 22 is different from the display brightness set to the brightness varying control portion 17C, the display brightness acquired from the display brightness table (DBR-TBL) 22 is set to the brightness varying control portion 17C (step S35 shown in FIG. 3).

The brightness varying control portion 17C controls the brightness of the display unit (DISP) 15 in accordance with the brightness level (the maximum brightness level: 10) set by the display control unit (DISP-CONT) 16.

As described above, the display brightness of the display unit (DISP) 15 is varied as the residual capacity of the battery 11 is changed. In this embodiment, when the residual capacity of the battery is changed from 100% to 75%, 50% and 25%, the display brightness of the display unit (DISP) 15 is changed at each timing. When the residual capacity of the battery is, for example, 100% to 90%, the display brightness level is 10 (the highest level). When the residual capacity is 69% to 60%, the display brightness level is 8.

As a result of the above-mentioned display control, the time, for which the equipment can be operated by the battery, can be elongated while preventing influence on the operation facility for the user.

Note that the residual capacity of the battery and the display brightness set to the display brightness table (DBR-TBL) 22 may, on a set-up window or a pop-up window, be arbitrarily changed under control of the CPU (not shown) for controlling the system.

Referring to FIG. 1 and FIG. 4, the operation of the third embodiment of the present invention will now be described. According to the third embodiment, the function capable of changing the automatic turn-off time (automatic interruption time) of the display in accordance with whether the equipment is being operated or not operated is realized.

In this embodiment, a case where the mouse or the keyboard is touched (including a case where no input is performed but it is simply touched) is determined as a state of operation by using the touch sensor. In a case where it is not touched, the state is determined to be the non-operation state. Thus, a function is realized which is capable of changing the automatic turn-off time of the display in accordance with the state (whether the equipment is being operated or not operated).

The microprocessor (PS-MPU) 14 periodically checks the state of each touch sensor (TS) 13 in a state where the system is operated by the battery 11 to determine whether the system is being operated or not operated so as to transmit display control information TCC including information whether the equipment is being operated or not operated to the display control unit (DISP-CONT) 16 (step S41 shown in FIG. 4).

Whether the equipment is being operated or not operated is determined such that when a user of the equipment touches the touch sensor (TS) 13 and, therefore, any one of the touch sensors (TS) 13 is turned on, a determination is performed that the equipment is being operated. When all of the touch sensors (TS) 13 are turned off, a determination is performed that the equipment is not being operated.

The display control unit (DISP-CONT) 16 makes a reference to a touch sensor off-time table (TSOT-TBL) 23 in accordance with information whether the equipment is being operated or not operated included in display control information TCC supplied from the microprocessor (PS-MPU) 14 to acquire the automatic turn-off time corresponding to whether the equipment is being operated or not operated so as to determine whether the automatic turn-off time is the same as the time set to the off-timer 17B (steps S42 to S44 shown in FIG. 4).

If the automatic turn-off time acquired from the touch sensor off-time table (TSOT-TBL) 23 is the same as the time set to the off-timer 17B, the time set to the off-timer 17B is not updated. If the automatic turn-off time acquired from the touch sensor off-time table (TSOT-TBL) 23 is different from the time set to the off-timer 17B, the automatic turn-off time acquired from the touch sensor off-time table (TSOT-TBL) 23 is set to the off-timer 17B (step S45 shown in FIG. 4).

In this embodiment, when the user of the equipment touches the touch sensor (TS) 13 and, therefore, any one of the touch sensors (TS) 13 is turned on (when a determination has been performed that the equipment is being operated), automatic turn-off time of 10 minutes is set to the off-timer 17B. When all of the touch sensors (TS) 13 are turned off (when a determination has been performed that the equipment is not being operated), automatic turn-off time of 0 minute (which is the time causing the display to be immediately turned off when the finger is released from the touch sensor (TS) 13) is set to the off-timer 17B.

The off-timer 17B starts measuring the time when the keyboard (KB), the mouse (Mouse), the touch pen or the like of the operation and input portion 12 is not operated. When the measured time reaches the set time, the switch circuit (SW) 17A, which turns on/off the backlight of the display unit (DISP) 15, is turned off so as to interrupt supply of electric power to the backlight of the display unit (DISP) 15. The time measured by the off-timer 17B is reset whenever the keyboard (KB), the mouse (Mouse), the touch pen or the like of the operation and input portion 12 is operated.

As described above, the automatic turn-off time (automatic interruption time) of the display unit (DISP) 15 is varied in accordance with whether the equipment is being operated or not.

As a result of the above-mentioned display control, the time for which the equipment can be operated by the battery can be elongated while preventing the influence on the operation facility for the user.

The automatic turn-off time (the automatic interruption time), which is set to the touch sensor off-time table (TSOT-TBL) 23, may arbitrarily be changed on a set-up window or a pop-up window under control of the CPU (not shown) for controlling the system.

Referring to FIGS. 1 and 5, the operation according to the fourth embodiment of the present invention will now be described. According to the fourth embodiment, a function capable of changing the display brightness of the display in accordance with whether the equipment is being operated or not operated is realized.

In this embodiment, a state where the mouse, the keyboard or the like (including a case where it is touched without any input) is touched is determined to a state where the equipment is being operated. If it is not touched, a determination is performed that the equipment is not being operated. Thus, a function capable of changing the display brightness of the display unit corresponding to each state is realized.

The microprocessor (PS-MPU) 14 periodically checks the state of each touch sensor (TS) 13 in a state where the system is being operated by the battery 11 to determine whether the equipment is being operated or not operated so as to transmit, to the display control unit (DISP-CONT) 16, display control information TCC including information whether the equipment is being operated or not operated (step S51 shown in FIG. 5).

The determination whether the equipment is being operated or not operated is performed such that when the user of the equipment touches the touch sensor (TS) 13 and, therefore, any one of the touch sensors (TS) 13 is turned on, a determination is performed such that the equipment is being operated. When all of the touch sensors (TS) 13 are turned off, a determination is performed that the equipment is being operated.

The display control unit (DISP-CONT) 16 makes a reference to the touch sensor brightness table (TSBR-TBL) 24 in accordance with information whether the equipment is being operated or not operated included in display control information TCC supplied from the microprocessor (PS-MPU) 14 to acquire the display brightness corresponding whether the equipment is being operated or not operated so as to determine whether the display brightness is the same as the time set to the brightness varying control portion 17C (steps S52 to S54 shown in FIG. 5).

If the display brightness acquired from the touch sensor brightness table (TSBR-TBL) 24 is the same as the display brightness set to the brightness varying control portion 17C, the time set to the off-timer 17B is not updated. If the display brightness acquired from the touch sensor brightness table (TSBR-TBL) 24 is different from the display brightness set to the brightness varying control portion 17C, the display brightness acquired from the touch sensor brightness table (TSBR-TBL) 24 is set to the brightness varying control portion 17C (step S545 shown in FIG. 5).

In this embodiment, when the user of the equipment touches the touch sensor (TS) 13 and any one of the touch sensors (TS) 13 is turned on (when a determination has been performed that the equipment is being operated), the display brightness level of 10 (the highest level) is set to the brightness varying control portion 17C. When all of the touch sensors (TS) 13 are turned off (when a determination has been performed that the equipment is not being operated), display brightness level of 4 is set to the brightness varying control portion 17C.

The brightness varying control portion 17C controls the display brightness of the display unit (DISP) 15 in accordance with the brightness level set by the display control unit (DISP-CONT) 16.

As a result of the above-mentioned control, the time for which the equipment can be operated by the battery 11 can be elongated while preventing influence upon the operation facility for the user.

Note that the display brightness, which is set to the touch sensor brightness table (TSBR-TBL) 24, may arbitrarily be changed on, for example, a set-up window or a pop-up window under control of the CPU (not shown) for controlling the system.

Although the above-mentioned embodiments are arranged to monitor whether the equipment is being operated or not operated by using the touch sensor (TS) 13, the present invention is not limited to this. A means having, for example, a photosensor to recognize whether the state of operation of the equipment when a predetermined portion is covered by a portion of the body, for example, the hand; and a means having, for example, an infrared-ray sensor, a pressure sensor or another detection means to recognize the state of operation of the equipment may be applied to the third and fourth embodiments.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A display control method for a battery-drivable electronic equipment having an automatic display-turn-off function in which a display operation is interrupted so as to save power if an input unit is not operated within an automatic display-turn-off time, the method comprising the computer steps of:

detecting a change of a residual capacity of the battery; and changing the automatic display-turn-off time as the residual capacity of the battery is changed.

2. The method according to claim 1, further comprising the step of automatically turning-off the equipment after the changed time has elapsed when the equipment is in a non-use state.

3. A battery-drivable electronic equipment having an automatic display-turn-off function in which a display operation is interrupted so as to save power if an input unit is not operated within an automatic display-turn-off time, comprising:

means for monitoring a residual capacity of the battery; and means for changing the automatic display turn-off time in accordance with the residual capacity of the battery.

4. The apparatus according to claim 3, further comprising:

means for monitoring a no-use state of the equipment; and means for turning off the display if the monitored no-use state remains for a period defined by the auto-off time.

5. The apparatus according to claim 3, further comprising:

a table defining a relation between the residual capacity of the battery and the auto-off time; and means for changing the auto-off time in accordance with the battery residual capacity by referring to the table.

6. The equipment according to claim 3, further including means for automatically turning-off the equipment after the changed time has elapsed when the equipment is in a non-use state.

7. An article of manufacture comprising:

a computer usable medium having readable program code means embodied therein for causing an auto-off time of a battery-driven display unit to be set variably, the computer readable program code means in said article of manufacture, comprising:

a computer readable program code means for causing a computer to detect a residual capacity of a battery; and a computer readable program code means for causing the auto-off time of the display unit to be set variably depending on the detected residual capacity.

8. A battery-drivable electronic equipment having an automatic display-turn-off function in which a display operation is interrupted so as to save power if an input unit is not operated within an auto-off time, comprising:

means for monitoring a residual capacity of the battery;

a table defining a relation between the residual capacity of the battery and the auto-off time; and means for changing the auto-off time in accordance with the battery residual capacity by referring to the table.

* * * * *